(12) United States Patent
Feng et al.

(10) Patent No.: US 8,982,082 B2
(45) Date of Patent: Mar. 17, 2015

(54) TOUCH PANEL

(71) Applicant: Beijing FUNATE Innovation Technology Co., Ltd., Beijing (CN)

(72) Inventors: Chen Feng, Beijing (CN); Li Qian, Beijing (CN); Yu-Quan Wang, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 79 days.

(21) Appl. No.: 13/863,837

(22) Filed: Apr. 16, 2013

(65) Prior Publication Data

US 2014/0145980 A1    May 29, 2014

(30) Foreign Application Priority Data

Nov. 23, 2012 (CN) .......................... 2012 1 0480841

(51) Int. Cl.
*G06F 3/041* (2006.01)
(52) U.S. Cl.
CPC ..................................... *G06F 3/041* (2013.01)
USPC ........................................... 345/173; 345/174
(58) Field of Classification Search
USPC ............ 345/156, 173, 174; 178/18.01–18.07, 178/19.01–19.05
See application file for complete search history.

(56) References Cited

U.S. PATENT DOCUMENTS

| | | | |
|---|---|---|---|
| 2009/0153502 A1* | 6/2009 | Jiang et al. | 345/173 |
| 2009/0167710 A1* | 7/2009 | Jiang et al. | 345/173 |
| 2010/0093247 A1* | 4/2010 | Jiang et al. | 445/24 |
| 2011/0032196 A1* | 2/2011 | Feng et al. | 345/173 |
| 2014/0144766 A1* | 5/2014 | Feng et al. | 200/600 |
| 2014/0145817 A1* | 5/2014 | Feng et al. | 338/47 |

\* cited by examiner

*Primary Examiner* — Ricardo L Osorio
(74) *Attorney, Agent, or Firm* — Novak Druce Connolly Bove + Quigg LLP

(57) ABSTRACT

A touch panel includes a substrate, a transparent conductive layer located on the substrate, and a number of electrodes electrically connected to the transparent conductive layer. The transparent conductive layer includes a carbon nanotube film. The carbon nanotube film includes a number of carbon nanotube wires substantially parallel with each other and a number of carbon nanotube clusters located between the number of carbon nanotube wires. The carbon nanotube wires extend along an X direction and are spaced from each other along a Y direction. The carbon nanotube clusters between each adjacent two of the carbon nanotube wires are spaced from each other along the X direction. The X direction is intercrossed with the Y direction.

20 Claims, 5 Drawing Sheets

TOUCH PANEL

CROSS-REFERENCE TO RELATED APPLICATIONS

This application claims all benefits accruing under 35 U.S.C. §119 from China Patent Applications Application No. 201210480841.8, filed on Nov. 23, 2012 in the China Intellectual Property Office, disclosures of which are incorporated herein by references.

BACKGROUND

1. Technical Field

The present disclosure relates to touch panels, particularly to a carbon nanotube based touch panel.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation.

Different types of touch panels, including a resistance-type, a capacitance-type, an infrared-type and a surface sound wave-type have been developed. A conventional capacitance-type touch panel includes a conductive indium tin oxide (ITO) layer as an optically transparent conductive layer. However, the ITO layer is generally formed by means of ion-beam sputtering and etched by laser beam, and the method is relatively complicated. Furthermore, the ITO layer has poor wearability, low chemical endurance and uneven resistance in an entire area of the panel. All the above-mentioned problems of the ITO layer produce a touch panel with low sensitivity, accuracy, and brightness.

What is needed, therefore, is to provide a capacitance-type touch panel which can overcome the short come described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present capacitance-type touch panels. The capacitance-type touch panel can include a substrate, at least one transparent conductive layer, and a plurality of electrodes. The at least one transparent conductive layer can be located on one surface of the substrate or two opposite surfaces of the substrate. The plurality of electrodes are spaced from each other and electrically connected with the at least one transparent conductive layer. The at least one transparent conductive layer includes a carbon nanotube film.

Figure 1:
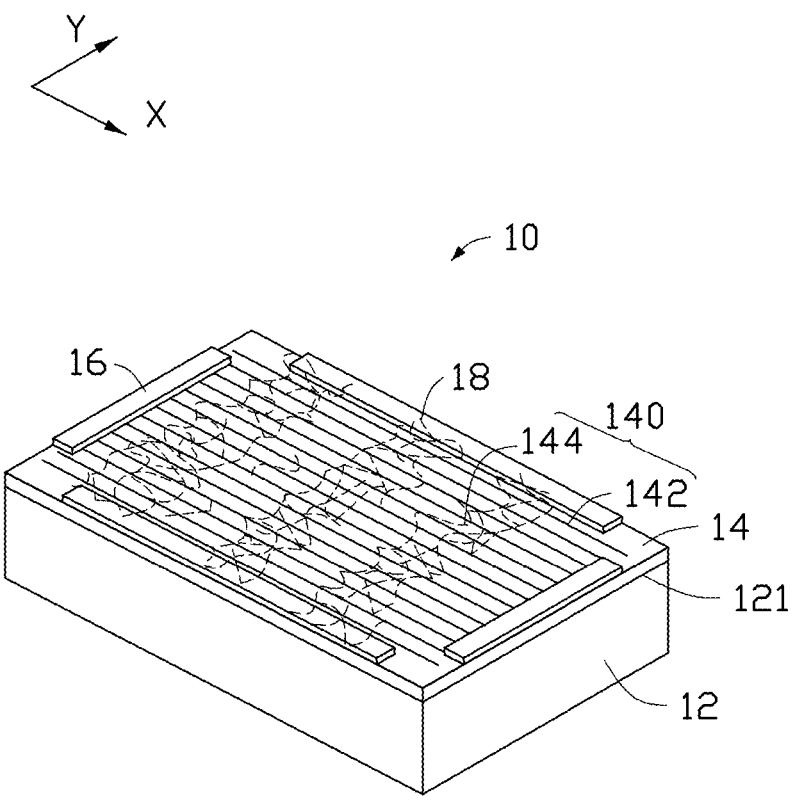
FIG. 1 is a schematic view of one embodiment of a touch panel.
Figure 2:
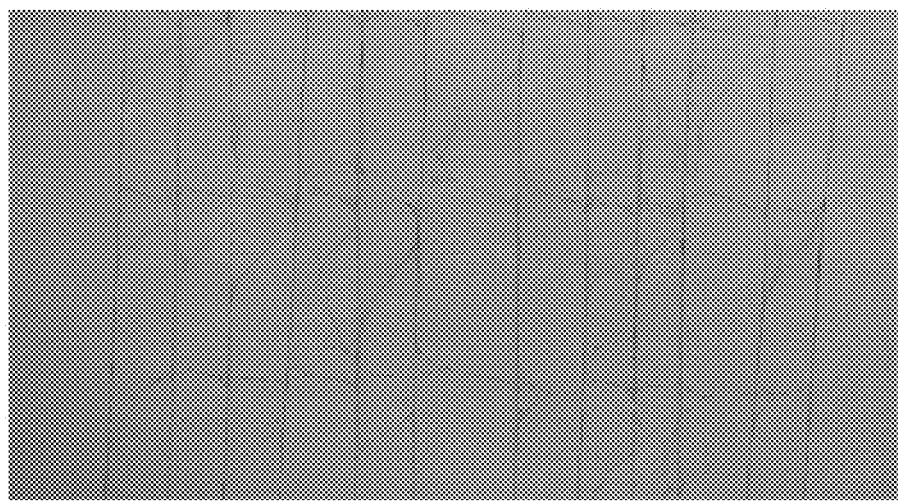
FIG. 2 is an optical microscope image of one embodiment of a carbon nanotube film of a touch panel.

Referring to FIG. 1, a touch panel 10 of one embodiment includes a substrate 12, a first transparent conductive layer 14, two first electrodes 16, and two second electrodes 18. The substrate 12 includes a first surface 121 and a second surface (not labeled) opposite to the first surface 121. The first transparent conductive layer 14 is located on the first surface 121. The two first electrodes 16 and two second electrodes 18 are spaced from each other and electrically connected to the first transparent conductive layer 14 so that an isopotential surface can be formed on the first transparent conductive layer 14.

The substrate 12 is configured to support the first transparent conductive layer 14, the two first electrodes 16, and the two second electrodes 18. The substrate 12 can be a film or a sheet. The substrate 12 can be flat or curved. The substrate 12 is transparent with a light transmittance greater than 70%, especially greater than 90%. The substrate 12 can be made of rigid materials such as glass, quartz, diamond, plastic or any other suitable material. The substrate 12 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), acrylonitrile-butadiene-styrene copolymer (ABS), polyamide (PA), polyesters, or acrylic resin. The thickness of the substrate 12 can be in a range from about 0.1 millimeters to about 1 centimeter. In one embodiment, the substrate 12 is a flat PC sheet.

The first transparent conductive layer 14 includes a carbon nanotube film 140 having resistance anisotropy. In one embodiment, the first transparent conductive layer 14 is a pure carbon nanotube film 140 consisting of a plurality of carbon nanotubes. The carbon nanotube film 140 is a free-standing structure. The term "free-standing structure" includes, but is not limited to, the fact that the carbon nanotube film 140 can sustain the weight of itself when it is hoisted by a portion thereof without any significant damage to its structural integrity.

Referring to FIGS. 1-4, the carbon nanotube film 140 includes a plurality of carbon nanotube wires 142 spaced from each other and a plurality of carbon nanotube clusters 144 joined to the plurality of carbon nanotube wires 142 by van der Waals attractive force. The plurality of carbon nanotube wires 142 are connected by the plurality of carbon nanotube clusters 144 so that the carbon nanotube film 140 is firm and has high strength. The plurality of carbon nanotube clusters 144 are separated by the plurality of carbon nanotube wires 142. The carbon nanotube clusters 144 between each adjacent two of the plurality of carbon nanotube wires 142 are spaced from each other.

The plurality of carbon nanotube wires 142 are parallel with each other, extend along an X direction, and spaced from each other along a Y direction. The X direction and the Y direction are not parallel. The X direction can be perpendicular with the Y direction. The plurality of carbon nanotube wires 142 form a plurality of conductive paths along the X direction. The plurality of carbon nanotube wires 142 are coplanar. The plurality of carbon nanotube wires 142 can be located equidistantly with each other. The distance between the adjacent two of the plurality of carbon nanotube wires 142 can be above 0.1 millimeters. The cross-section of each of the plurality of carbon nanotube wires 142 can be elliptical, rectangular, triangular or round. The effective diameter of each of the plurality of carbon nanotube wires 142 can be in a range from about 0.1 micrometers to about 100 micrometers. In one embodiment, the effective diameter of each of the plurality of carbon nanotube wires 142 can be in a range from about 5 micrometers to about 50 micrometers. The term "effective diameter" means the maximum length of the cross-section of each of the plurality of carbon nanotube wires 142. Each of the plurality of carbon nanotube wires 142 includes a plurality of carbon nanotubes arranged to extend along a length direction of the plurality of carbon nanotube wires 142 that is parallel to the X direction. The plurality of carbon nanotubes are joined end to end by van der Waals attractive force between. Thus, the carbon nanotube film 140 has the smallest resistance along an X direction parallel to the surface of the carbon nanotube film 140.

Figure 3:
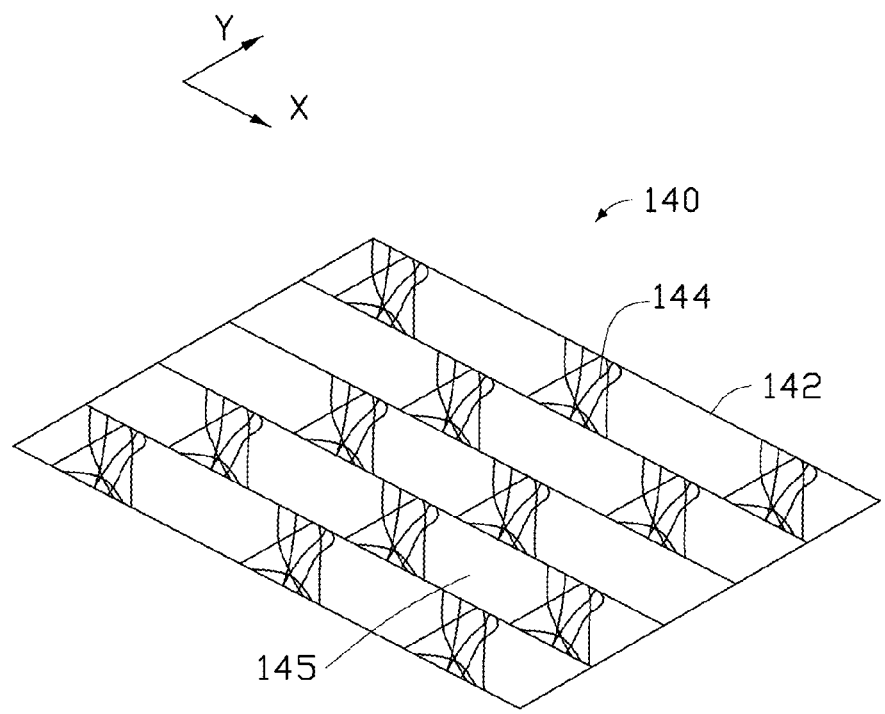
FIG. 3 is a schematic view of one embodiment of a carbon nanotube film of a touch panel.

The plurality of carbon nanotube clusters 144 can be spaced from each other, located between the plurality of carbon nanotube wires 142, and in contact with the plurality of carbon nanotube wires 142. Thus, the carbon nanotube film 140 forms a free-standing structure. Each of the plurality of carbon nanotube clusters 144 can be located between adjacent two of the plurality of carbon nanotube wires 142 and joined with the adjacent two of the plurality of carbon nanotube wires 142 by van der Waals attractive force. The plurality of carbon nanotube clusters 144 can be connected with each other to form a conductive path along the Y direction. The length of each of the plurality of carbon nanotube clusters 144 along the Y direction can be the same as the distance between the adjacent two of the plurality of carbon nanotube wires 142. The length of each of the plurality of carbon nanotube clusters 144 along the Y direction is greater than 0.1 millimeters. The carbon nanotube clusters 144 between the adjacent two of the plurality of carbon nanotube wires 142 are spaced from each other. Namely, the plurality of carbon nanotube clusters 144 are spaced from each other along the X direction. The distance between two of the plurality of carbon nanotube clusters 144 along the X direction is greater than 1 millimeter. In one embodiment, the plurality of carbon nanotube clusters 144 are arranged to form an array as shown in FIG. 1. Alternatively, adjacent two of the carbon nanotube clusters 144 arranged along the Y direction can be dislocated as shown in FIG. 3, namely, the carbon nanotube clusters 144 are not arranged to form a row along the Y direction.

The carbon nanotubes of each carbon nanotube cluster 144 are joined by van der Waals attractive force. An angle between the axial direction of each carbon nanotube of the carbon nanotube cluster 144 and the X direction is greater than 0 degrees and less than or equal to 90 degrees. In one embodiment, the angle between the axial direction of each carbon nanotube and the X direction is greater than or equal to 45 degrees and less than or equal to 90 degrees. In one embodiment, the angle between the axial direction of each carbon nanotube and the X direction is greater than or equal to 60 degrees and less than or equal to 90 degrees. Thus, the carbon nanotubes of each carbon nanotube cluster 144 can be intercrossed with each other to form a net structure.

The carbon nanotube film 140 can be a pure structure consisting of only the plurality of carbon nanotubes. The carbon nanotube film 140 defines a plurality of holes 145 between the plurality of carbon nanotube wires 142 and the plurality of carbon nanotube clusters 144. When the plurality of carbon nanotube wires 142 and the plurality of carbon nanotube clusters 144 are arranged regularly, the plurality of holes 145 are also arranged regularly. For example, when the plurality of carbon nanotube wires 142 and the plurality of carbon nanotube clusters 144 are arranged to form an array, the plurality of holes 145 are also arranged to form an array. A dutyfactor of the carbon nanotube film 140 is an area ratio between the total area of the plurality of carbon nanotube wires 142 and the plurality of carbon nanotube clusters 144 and the total area of the plurality of holes 145, namely, the ratio between the total area of the plurality of carbon nanotubes of the carbon nanotube film 140 and the total area of the plurality of holes 145. The dutyfactor of the carbon nanotube film 140 can be greater than 0 and less than or equal to 1:19. In one embodiment, the dutyfactor of the carbon nanotube film 140 is greater than 0 and less than or equal to 1:49 so that the light transmittance of the carbon nanotube film 140 is greater than 95%. In one embodiment, the light transmittance of the carbon nanotube film 140 is greater than 98%.

Furthermore, the carbon nanotube film 140 may include a minority of dispersed carbon nanotubes located around the plurality of carbon nanotube wires 142 and the plurality of carbon nanotube clusters 144. The minority of dispersed carbon nanotubes have little effect on the properties of the carbon nanotube film 140.

The plurality of carbon nanotube wires 142 can form a plurality of first conductive paths along the X direction. The plurality of carbon nanotube clusters 144 can form a plurality of second conductive paths along the Y direction as shown in FIG. 1. The plurality of first conductive paths are spaced from each other along the Y direction and the plurality of second conductive paths are spaced from each other along the X direction. Thus, the carbon nanotube film 140 is electrical conductive both along the X direction and the Y direction. The carbon nanotube film 140 is resistance anisotropy having the resistance along the Y direction greater than the resistance along the X direction. The resistance ratio between the resistance along the Y and the resistance along the X direction is greater than or equal to 10. In one embodiment, the resistance ratio between the resistance along the Y and the resistance along the X direction is greater than or equal to 20. In one embodiment, the resistance ratio between the resistance along the Y and the resistance along the X direction is greater than or equal to 50.

The carbon nanotube film 140 of FIG. 1 or FIG. 3 can be made by following steps:

step (a), providing a drawn carbon nanotube film, wherein the drawn carbon nanotube film is drawn from a carbon nanotube array and includes a plurality of successive and oriented carbon nanotubes joined end-to-end by van der Waals attractive force therebetween and arranged to extend along the same direction;

step (b), patterning the drawn carbon nanotube film so that at least one row openings are formed on the drawn carbon nanotube film along the extending direction of the oriented carbon nanotubes, wherein each of the at least one row openings includes a plurality of openings spaced from each other;

step (c), shrinking the patterned drawn carbon nanotube film by treating the patterned drawn carbon nanotube film with an organic solvent, wherein the organic solvent is volatile and can be ethanol, methanol, acetone, dichloromethane, or chloroform.

Figure 4:
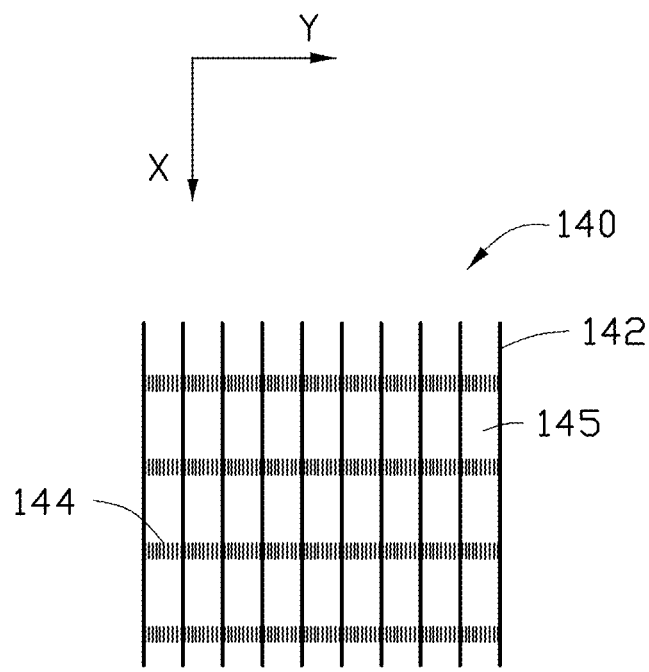
FIG. 4 is a schematic view of another embodiment of a carbon nanotube film of a touch panel.

Referring to FIG. 4, in one embodiment, the axial direction of each carbon nanotube of the carbon nanotube clusters 144 and the X direction can be greater than 0 degrees and less than or equal to 45 degrees. In one embodiment, the angle between the axial direction of each carbon nanotube of the carbon nanotube clusters 144 and the X direction can be greater than or equal to 0 degrees and less than or equal to 30 degrees. In one embodiment, the axial directions of the carbon nanotubes of the carbon nanotube clusters 144 are substantially parallel with the X direction, namely the carbon nanotubes of the carbon nanotube clusters 144 are substantially parallel with the carbon nanotube wires 142. The carbon nanotube film 140 of FIG. 4 can be made by the method similar to the method for making the carbon nanotube film 140 of FIG. 1 or FIG. 3 except that in step (c), the patterned drawn carbon nanotube film is treated with a water or an mixture of water and organic solvent. The water or the mixture of water and organic solvent has a smaller interfacial tension on the patterned drawn carbon nanotube film compare with pure organic solvent.

The first transparent conductive layer 14 can include a plurality of carbon nanotube films 140 stacked with each other or a plurality of coplanar carbon nanotube films 140 located side by side. The carbon nanotube wires 142 of adjacent two of the carbon nanotube films 140 can be overlapped and substantially parallel with each other. The carbon nanotube clusters 144 of adjacent two of the carbon nanotube films 140 can be overlapped or dislocated.

The carbon nanotube film 140 can be located on the substrate 12 directly and adhered to the substrate 12 by an adhesive layer (not shown). The adhesive layer is configured to fix the carbon nanotube film 140 on the substrate 12. The adhesive layer can be transparent, opaque, or translucent. The adhesive layer can be an UV glue layer or optically clear adhesive (OCA) layer. The OCA layer is a clear and transparent double-sided adhesive tape with a light transmittance greater than 99%. Material of the OCA layer is polymethyl methacrylate (PMMA), which also named as plexiglass or acrylic. The thickness of the adhesive layer can be in a range from about 1 nanometer to about 500 micrometers, for example, the thickness is in a range from about 1 micrometer to about 2 micrometers. In one embodiment, the adhesive layer is a PMMA layer with a thickness of 1.5 micrometers.

The two first electrodes 16 are located on two opposite sides of the first transparent conductive layer 14 and extend along the Y direction. The two second electrodes 18 are located on two opposite sides of the first transparent conductive layer 14 and extend along the X direction. The two first electrodes 16 and the two second electrodes 18 can be located on the same or different surface of the first transparent conductive layer 14, on the surface of the substrate 12, or between the first transparent conductive layer 14 and the substrate 12. The two first electrodes 16 and the two second electrodes 18 are electrically connected with the first transparent conductive layer 14 so that a resistance net can be formed on the first transparent conductive layer 14. In one embodiment, both the two first electrodes 16 and the two second electrodes 18 are located on the same surface of the first transparent conductive layer 14. The two first electrodes 16 and the two second electrodes 18 can be made of material such as metal, carbon nanotube, conductive polymer, conductive silver paste, or ITO. The two first electrodes 16 and the two second electrodes 18 can be made by etching a metal film, etching an ITO film, or printing a conductive silver paste. The shape of the two first electrodes 16 and the two second electrodes 18 can be selected according to need, such as elliptical, rectangular, square, triangular or round. In one embodiment, the two first electrodes 16 and the two second electrodes 18 are made by printing conductive silver paste concurrently. The two first electrodes 16 are electrically connected with the plurality of carbon nanotube wires 142. The two second electrodes 18 are electrically connected with the plurality of carbon nanotube clusters 144.

Furthermore, other function layers can be inserted into the touch panel 10 according to need. In one embodiment, a second transparent conductive layer (not shown) and a plurality of third electrodes (not shown) can be located on the second surface of the substrate 12. The second transparent conductive layer is resistance anisotropy. The second transparent conductive layer can include the carbon nanotube film 140 or other patterned transparent conductive film such as patterned ITO layer or patterned ZnO layer. The patterned transparent conductive film can includes a plurality of conductive patterns in shape of rectangle or rhombus. The plurality of third electrodes are spaced from each other and electrically connected with the second transparent conductive layer.

In operation, a voltage is supplied to the first transparent conductive layer 14 via the two first electrodes 16 and the two second electrodes 18 to form an isopotential surface is formed on the first transparent conductive layer 14. When an object such as a finger or a stylus get close to or touch the touch panel 10, a coupling capacitance is can be produced between the object and the first transparent conductive layer 14. The capacitance is conductor for a high-frequency current, so a part of the current will be conducted away from the object. Thus, the coordinate of the touch point can be just by detecting current change of each of the two first electrodes 16 and the two second electrodes 18.

The carbon nanotubes have good mechanical properties, good chemical stability, and good moisture resistance, so the carbon nanotube film 140 of the touch panel 10 also has the above advantages. Thus, the touch panel 10 has good usability and long service life.

Figure 5:
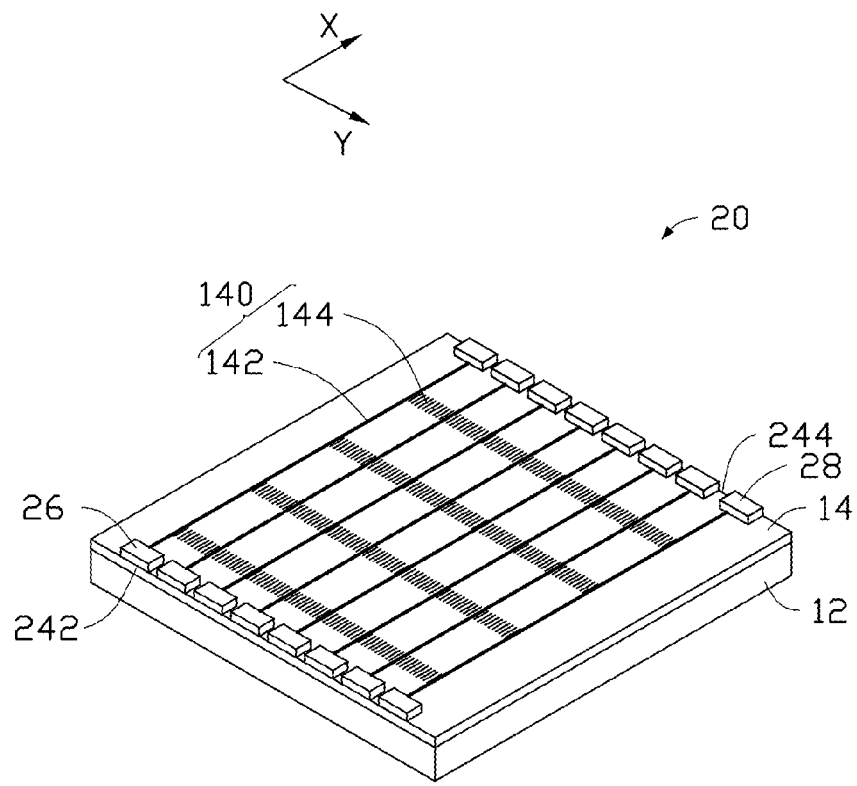
FIG. 5 is a schematic view of another embodiment of a touch panel.

Referring to FIG. 5, a multi point capacitance-type touch panel 20 of one embodiment includes a substrate 12, a first transparent conductive layer 14, a plurality of first electrodes 26, and a plurality of second electrodes 28. The first transparent conductive layer 14 is the carbon nanotube film 140 of FIG. 4.

The first transparent conductive layer 14 has a first side 242 and a second side 244 opposite to the first side 242. The first side 242 and the second side 244 are parallel with the Y direction. The plurality of first electrodes 26 are located on the first side 242 of the first transparent conductive layer 14 and spaced from each other along the Y direction. The plurality of second electrodes 28 are located on the second side 244 of the first transparent conductive layer 14 and spaced from each other along the Y direction. The plurality of first electrodes 26 and the plurality of second electrodes 28 are electrically connected to each other by the first transparent conductive layer 14 to form a plurality of conductive paths. Each of the plurality of conductive paths includes at least one of the plurality of carbon nanotube wires 142. In one embodiment, each of the plurality of carbon nanotube wires 142 is electrically connected to a single one of the plurality of first electrodes 26 and a single one of the plurality of second electrodes 28. Each of the plurality of carbon nanotube wires 142 is parallel with the X direction or intersects with the X direction with an angle less than 90 degrees.

The plurality of first electrodes 26 and the plurality of second electrodes 28 can be made of the same materials as the two first electrodes 16 and two second electrodes 18. The distance between adjacent two of the plurality of first electrodes 26 or adjacent two of the plurality of second electrodes 28 should be in a range from about 3 millimeters to about 5 millimeters. If the distance is too great, the accuracy of the touch panel 20 will be decreased. The length of each of the plurality of first electrodes 26 or each of the plurality of second electrodes 28 along the Y direction should be in a range from about 1 millimeter to about 5 millimeters. If the length is too great, the accuracy of the touch panel 20 will be decreased. The number of the plurality of first electrodes 26 and the number of the plurality of second electrodes 28 can be selected according to need. In one embodiment, the touch panel 20 includes eight first electrodes 26 and eight second electrodes 28. The length of each of the plurality of first electrodes 26 or each of the plurality of second electrodes 28 along the Y direction is about 1 millimeter. The distance between adjacent two of the plurality of first electrodes 26 or adjacent two of the plurality of second electrodes 28 is about 3 millimeters.

Because the carbon nanotube film 140 has resistance anisotropy, when the object such as a finger or a stylus get close to or touch the touch panel 20, the resistance between the touch point and the first electrode 26 nearest to the touch point is much smaller than the resistance between the touch point and the other first electrodes 26, and the resistance between the touch point and the second electrode 28 nearest to the touch point is much smaller than the resistance between the touch point and the other second electrodes 28. Thus, the coordinate of the touch point can be just by detecting resistance and capacitance of each of the first electrodes 26 and the second electrodes 28. Because the plurality of carbon nanotube wires 142 are joined by the plurality of carbon nanotube clusters 144 along Y direction, the resistance and capacitance detected at each of the first electrodes 26 and the second electrodes 28 includes the resistance signal and capacitance signal of both the corresponding carbon nanotube wire 142 and the corresponding carbon nanotube cluster 144. Thus, the resistances and capacitances detected at adjacent two of the first electrodes 26 and the second electrodes 28 are much different. That is, the product of the resistance and the capacitance detected at the corresponding first electrode 26 and the corresponding second electrode 28 are much different before and after being touched by the object even if the touch pressure is small. The large and significant product changes of the resistance and the capacitance can improve the detection accuracy of the capacitance-type touch panel 20.

In one embodiment, the plurality of first electrodes 26 or the plurality of second electrodes 28 can be omitted. That is, the capacitance-type touch panel 20 can only includes the plurality of first electrodes 26 on the first side 242 of the first transparent conductive layer 14 or the plurality of second electrodes 28 on the second side 244 of the first transparent conductive layer 14.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A touch panel comprising:
a substrate having a surface;
a transparent conductive layer located on the surface; and
a plurality of electrodes spaced from each other and electrically connected to the transparent conductive layer;
wherein the transparent conductive layer comprises a carbon nanotube film; the carbon nanotube film comprises a plurality of carbon nanotube wires substantially parallel with each other and a plurality of carbon nanotube clusters located between the plurality of carbon nanotube wires; the plurality of carbon nanotube wires extend along an X direction and are spaced from each other along a Y direction, some of the plurality of carbon nanotube clusters, between each adjacent two of the plurality of carbon nanotube wires, are spaced from each other along the X direction; and the X direction intersects the Y direction.

2. The touch panel of claim 1, wherein the carbon nanotube film consists of a plurality of carbon nanotubes.

3. The touch panel of claim 1, wherein the plurality of carbon nanotube wires are connected by the plurality of carbon nanotube clusters, and the carbon nanotube film is a free-standing structure.

4. The touch panel of claim 1, wherein the plurality of carbon nanotube clusters are joined to the plurality of carbon nanotube wires by van der Waals attractive force.

5. The touch panel of claim 1, wherein each of the plurality of carbon nanotube wires comprises a plurality of carbon nanotubes arranged to extend along the X direction and joined end to end by van der Waals attractive force between.

6. The touch panel of claim 1, wherein a distance between adjacent two of the plurality of carbon nanotube wires is above 0.1 millimeters.

7. The touch panel of claim 6, wherein a length of each of the plurality of carbon nanotube clusters along the Y direction is the same as the distance between the adjacent two of the plurality of carbon nanotube wires.

8. The touch panel of claim 7, wherein the length of each of the plurality of carbon nanotube clusters along the Y direction is greater than 0.1 millimeters.

9. The touch panel of claim 1, wherein a distance between adjacent two of the plurality of carbon nanotube clusters along the X direction is greater than 1 millimeter.

10. The touch panel of claim 1, wherein a resistance ratio between a first resistance along the Y of the carbon nanotube film and a second resistance along the X direction of the carbon nanotube film is greater than or equal to 20.

11. The touch panel of claim 1, wherein the carbon nanotube film is adhered to the substrate by an adhesive layer.

12. The touch panel of claim 1, wherein the plurality of electrodes comprises two first electrodes and two second electrodes; the two first electrodes are located on two opposite sides of the transparent conductive layer and extend along the Y direction; and the two second electrodes are located on two opposite sides of the transparent conductive layer and extend along the X direction.

13. The touch panel of claim 12, wherein the two first electrodes are electrically connected with the plurality of carbon nanotube wires, and the two second electrodes are electrically connected with the plurality of carbon nanotube clusters.

14. The touch panel of claim 1, wherein the plurality of electrodes comprises a plurality of first electrodes and a plurality of second electrodes; the transparent conductive layer has a first side and a second side opposite to the first side, and the first side and the second side are parallel with the Y direction; the plurality of first electrodes are located on the first side of the transparent conductive layer and spaced from each other along the Y direction; and the plurality of second electrodes are located on the second side of the transparent conductive layer and spaced from each other along the Y direction.

15. The touch panel of claim 14, wherein each of the plurality of carbon nanotube wires is electrically connected to a single one of the plurality of first electrodes and a single one of the plurality of second electrodes.

16. The touch panel of claim 1, wherein the plurality of electrodes are located on the same side of the transparent conductive layer.

17. A touch panel comprising:
a substrate having a surface;
a transparent conductive layer located on the surface; and
a plurality of electrodes spaced from each other and electrically connected to the transparent conductive layer;
wherein the transparent conductive layer comprises a carbon nanotube film; the carbon nanotube film comprises a plurality of carbon nanotube wires substantially parallel with each other and a plurality of carbon nanotube clusters located between the plurality of carbon nanotube wires; and the carbon nanotube film defines a plurality of holes, and a dutyfactor of the carbon nanotube film is less than or equal to 1:19.

18. The touch panel of claim 17, wherein the dutyfactor of the carbon nanotube film is less than or equal to 1:49.

19. A touch panel comprising:
a substrate having a first surface and a second surface opposite to the first surface;
a first transparent conductive layer located on the first surface;
a second transparent conductive layer located on the second surface;
a plurality of first electrodes spaced from each other and electrically connected to the first transparent conductive layer; and
a plurality of second electrodes spaced from each other and electrically connected to the second transparent conductive layer;
wherein at least one of the first transparent conductive layer and the second transparent conductive layer comprises a carbon nanotube film; the carbon nanotube film comprises a plurality of carbon nanotube wires substantially parallel with each other and a plurality of carbon nanotube clusters located between the plurality of carbon nanotube wires; the plurality of carbon nanotube wires extend along an X direction and are spaced from each other along a Y direction, some of the plurality of carbon nanotube clusters, between each adjacent two of the plurality of carbon nanotube wires, are spaced from each other along the X direction; and the X direction intersects the Y direction.

20. The touch panel of claim 19, wherein both the first transparent conductive layer and the second transparent conductive layer comprises the carbon nanotube film.

\* \* \* \* \*